United States Patent
Wei et al.

(10) Patent No.: US 11,513,051 B1
(45) Date of Patent: Nov. 29, 2022

(54) SHALE STRESS SENSITIVITY TESTING DEVICE AND METHOD

(71) Applicant: Southwest Petroleum University, Chengdu (CN)

(72) Inventors: Mingqiang Wei, Chengdu (CN); Yonggang Duan, Chengdu (CN); Quantang Fang, Chengdu (CN); Zhenglan Li, Chengdu (CN); Le Luo, Chengdu (CN); Keyi Ren, Chengdu (CN); Xin Wang, Chengdu (CN); Shuxin Li, Chengdu (CN); Zhihong Nie, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/854,415

(22) Filed: Jun. 30, 2022

(30) Foreign Application Priority Data

Jun. 30, 2021 (CN) .......................... 202110732377.6

(51) Int. Cl.
  *G01N 15/08* (2006.01)
  *G01N 33/24* (2006.01)
(52) U.S. Cl.
  CPC ..... *G01N 15/0806* (2013.01); *G01N 15/0826* (2013.01)
(58) Field of Classification Search
  CPC .... G01N 15/00; G01N 15/08; G01N 15/0806; G01N 15/0826; G01N 33/24
  See application file for complete search history.

(56) References Cited

U.S. PATENT DOCUMENTS

| | | | |
|---|---|---|---|
| 2018/0306736 A1 | 10/2018 | Li et al. | |
| 2018/0340417 A1 | 11/2018 | Cooper et al. | |
| 2019/0011344 A1 | 1/2019 | Zhou et al. | |
| 2019/0033198 A1 | 1/2019 | Atapour et al. | |
| 2019/0265138 A1 | 8/2019 | Ma et al. | |
| 2020/0018681 A1 | 1/2020 | Guo et al. | |
| 2021/0088429 A1* | 3/2021 | Li | G01N 3/068 |
| 2022/0214261 A1* | 7/2022 | Liu | G01N 15/0826 |

FOREIGN PATENT DOCUMENTS

| | | |
|---|---|---|
| CN | 202166597 U | 3/2012 |
| CN | 103868801 A | 6/2014 |
| CN | 203929557 U | 11/2014 |

(Continued)

*Primary Examiner* — Nguyen Q. Ha
(74) *Attorney, Agent, or Firm* — Nitin Kaushik

(57) ABSTRACT

The present invention discloses a shale stress sensitivity testing device and method. The testing device comprises a support table. The left and right ends of the upper surface of the support table are respectively provided with a left side plate and a right side plate. The top of the left and right side plates are connected with the left and right ends of the top plate. The chucks of the clamps are capable of reciprocating motion in the horizontal direction and circular motion in the front-rear direction. The present invention can change the intensity and direction of the effective stress of the rock sample, and determine the permeability of the rock sample under different effective stresses, thus enabling comprehensive testing of the stress sensitivity of shale in different directions and enhancing the accuracy of shale stress sensitivity testing.

8 Claims, 8 Drawing Sheets

(56) References Cited

FOREIGN PATENT DOCUMENTS

| | | | | |
|---|---|---|---|---|
| CN | 204405497 U | 6/2015 | | |
| CN | 106198338 A | 12/2016 | | |
| CN | 106248487 A | 12/2016 | | |
| CN | 206192801 U | 5/2017 | | |
| CN | 206920290 U | 1/2018 | | |
| CN | 207280877 U | 4/2018 | | |
| CN | 111220484 A | 6/2020 | | |
| CN | 111272632 A | 6/2020 | | |
| CN | 111579382 A | 8/2020 | | |
| CN | 111610106 A | 9/2020 | | |
| CN | 111999227 A | * 11/2020 | ......... | G01N 15/0826 |
| CN | 112268844 A | 1/2021 | | |
| CN | 212568238 U | 2/2021 | | |
| CN | 112924354 A | 6/2021 | | |
| CN | 113029792 A | 6/2021 | | |
| CN | 113029898 A | 6/2021 | | |

* cited by examiner

SHALE STRESS SENSITIVITY TESTING DEVICE AND METHOD

CROSS-REFERENCE TO RELATED APPLICATIONS

The application claims priority to Chinese patent application No. 202110732377.6, filed on Jun. 30, 2021, the entire contents of which are incorporated herein by reference.

TECHNICAL FIELD

The present invention relates to the technical field of oil and gas field development, in particular to a shale stress sensitivity testing device and method.

BACKGROUND

Shale is a sedimentary rock formed by the dehydration and cementation of clay, mainly composed of clay minerals (kaolinite, hydromica, etc.), with a distinct thin bedding structure. In the exploitation of shale oil and gas, there is a high stress sensitivity in shale, so it is necessary to test the stress sensitivity in shale. The shale in the deeply buried oil and gas reservoir is subject to overlying rock pressure, surrounding lateral pressure and pore fluid pressure, and its stress system is in triaxial stress equilibrium before the reservoir is developed. In the development of oil and gas fields, the pore fluid pressure in the reservoir has a large drop near the wellbore and a small drop in the area far away the wells, presenting a funnel-shaped distribution. The uneven distribution of pore fluid pressure will result in different stress sensitivities in reservoir shale at the same depth in different directions. However, the existing testing devices are not capable of comprehensively testing the stress sensitivity of the shale in all directions, resulting in inaccurate testing accuracy.

SUMMARY

In view of the above problems, the present invention aims to provide a shale stress sensitivity testing device and method.

The technical solution of the present invention is as follows;

On the one hand, the present invention provides a shale stress sensitivity testing device comprising a support table, wherein a left side plate and a right side plate are arranged at the left and right ends of upper surface of the support table and connected with the left and right ends of the top plate at the top;

The left side plate is provided with a first core clamp extending toward the right side plate; the first core clamp consists of a first connecting rod and a first chuck; the first connecting rod is provided with at least a hollow section 1, the top of the hollow section 1 that is connected to the air source at the top, and the first chuck is provided with a first fluid channel that is connected to the hollow section 1; the first chuck is capable of reciprocating motion in the horizontal direction and circular motion around the central axis of the first connecting rod;

The right side plate is provided with a second core clamp extending toward the left side plate; the second core clamp consists of a second connecting rod and a second chuck; the second connecting rod is provided with at least a hollow section 2 that is provided with a pressure relief valve and connected with a permeability tester, and the second chuck is provided with a second fluid channel that is connected to the hollow section 2; the second chuck is capable of reciprocating motion m the horizontal direction and circular motion around the central axis of the second connecting rod;

The top plate is provided with a stress loading device extending toward the support table: the stress loading device comprises an indenter and a pressure sensor which is arranged on the top of the indenter that is capable of reciprocating motion in the horizontal and vertical directions.

Preferably, the first core clamp further comprises a first cylinder, a hollow block, and a circular plate, the first connecting rod comprises a first connecting rod 1 and a first connection rod 2, and the hollow section 1 is arranged on the first connecting rod 2;

The first cylinder is arranged on the left side plate, and the first cylinder, the first connecting rod 1, the hollow block, the first connecting rod 2, and the first chuck are connected in sequence;

The inner diameter of the hollow block is smaller than the outer diameter of the circular plate, the inner wall of the hollow block is provided with a circular slot whose inner diameter is larger than the outer diameter of the circular plate, the circular plate is arranged in the circular slot, the left end of the first connecting rod 2 is connected to the circular plate after running through the right wall of the hollow block.

Preferably, the second core clamp further comprises a drive motor, a worm gear, a turbine, a first bearing, and a second cylinder, and the second connecting rod comprises a second connecting rod 1 and a second connecting rod 2; the hollow section 2 is arranged on the second connecting rod 2;

The drive motor is arranged on the support table, the bottom of the worm gear is connected to the output terminal of the drive motor; and the turbine is engaged with the worm gear;

The first bearing is arranged on the right side plate, the right end of the second connecting rod 1 is connected to the first bearing after running through the turbine, the left end of the second connecting rod 1 is connected with the right end of the second cylinder, and the left end of the second cylinder is connected with the right end of the second connecting rod 2.

Preferably, the support table is in a form of cabinet, and a cabinet door is hinged on one side of the cabinet.

Preferably, the drive motor is arranged in the cabinet, and the lower end of the worm gear is connected to the output terminal of the drive motor after running through the cabinet.

Preferably, a shock pad is provided between the drive motor bottom and the cabinet.

Preferably, a hollow slot is arranged inside the top plate, and a rectangular opening is made on the bottom of the top plate and drilled thoroughly to the hollow slot;

The stress loading device further comprises a first gear, a second gear, a third connecting rod, to fourth connecting rod, a fifth connecting rod, a sixth connecting rod, a seventh connecting rod, an eighth connecting rod, a ninth connecting rod, and a third cylinder; the length of the fourth connecting rod is greater than the radius of the second gear;

The left and right ends of the ninth connecting rod are connected with the left and right inner walls of the hollow slot, the eighth connecting rod is connected with the ninth connecting rod In a sliding manner, and the bottom of the eighth connecting rod is connected to the third cylinder after running through the rectangular opening, the bottom of the third cylinder is connected to the pressure sensor, and the bottom of the pressure sensor is connected to the indenter;

The worm gear runs through the top plate to enter the hollow slot and then is fixedly connected with the first gear, the second gear engages with the first gear, the lower part of the third connecting rod is fixedly connected with the second gear, the top of the third connecting rod is fixedly connected with the fourth connecting rod, the top of the fifth connecting rod is fixedly connected with the left aide of the fourth connecting rod, the right end of the sixth connecting rod is sleeved on the outer wall of the fifth connecting rod bottom, the left end of the sixth connecting rod is flexibly connected to the right end of the seventh connecting rod through the pin, and the left end of the seventh connecting rod is fixedly connected with the eighth connecting rod.

Preferably, groove is arranged on the inner surface of the bottom of the hollow slot, a second bearing is provided at the bottom of the groove, and the third connecting rod is connected to the second bearing after running through the second gear.

Preferably, the support table further comprises a support column, a support block, and a universal wheel with a brake, which are connected in sequence, and the support column is connected with the bottom of the support table;

The inner bottom of the support block is provided with a rubber pad, the bottom of the support column arranged on the rubber pad after running through the top of the support block, and the outer wall of the support column arranged inside the support block is sleeved with a buffer spring; one end of the buffer spring is connected with the rubber pad and the other end is connected with the inner top of the support block.

On the other hand, the present invention also provides a shale stress sensitivity testing method, herein the shale stress sensitivity tester described in any one of the above is used for testing, including the following steps:

Step 1: Select a core and measure its initial permeability;

Step 2: Clamp the core with the first core clamp and the second core clamp;

Step 3: Apply effective stress to the core by the stress loading device;

Step 4: Inject air into the core from the air source, and test the permeability value of the core under the effective stress described in Step 3 by means of the permeability tester;

Step 5: Adjust the test pressure through the pressure relief valve, change the effective stress applied in Step 3 and repeat Step 4 to obtain the core permeability values under different effective stresses, and then calculate the dimensionless permeability value;

Step 6: Linearly regress the data by taking the effective stress as the abscissa and the dimensionless permeability value as the ordinate; the straight slope obtained is the stress sensitivity coefficient.

The present invention has the following beneficial effects:

In the present invention, the first clamp and the second clamp are provided to enable the rock sample to rotate freely; the stress loading device is capable of reciprocating motion in the horizontal direction to make the indenter act on different axial directions of the core, and the effective stresses of different intensities can be loaded with its reciprocating motion. In conclusion, the present invention can test the stress sensitivity of the core in different axial and radial directions and provide important technical support for the development of oil and gas fields.

BRIEF DESCRIPTION OF DRAWINGS

In order to explain the embodiments of the present invention or the technical solutions in the prior art more clearly, the following will make a brief introduction to the drawings needed in the description of the embodiments or the prior art. Obviously, the drawings in the following description are merely some embodiments of the present invention. For those of ordinary skill in the art, other drawings can be obtained based on the structures shown in these drawings without any creative effort.

Explanation of numbers marked in the figure.

Figure 1:
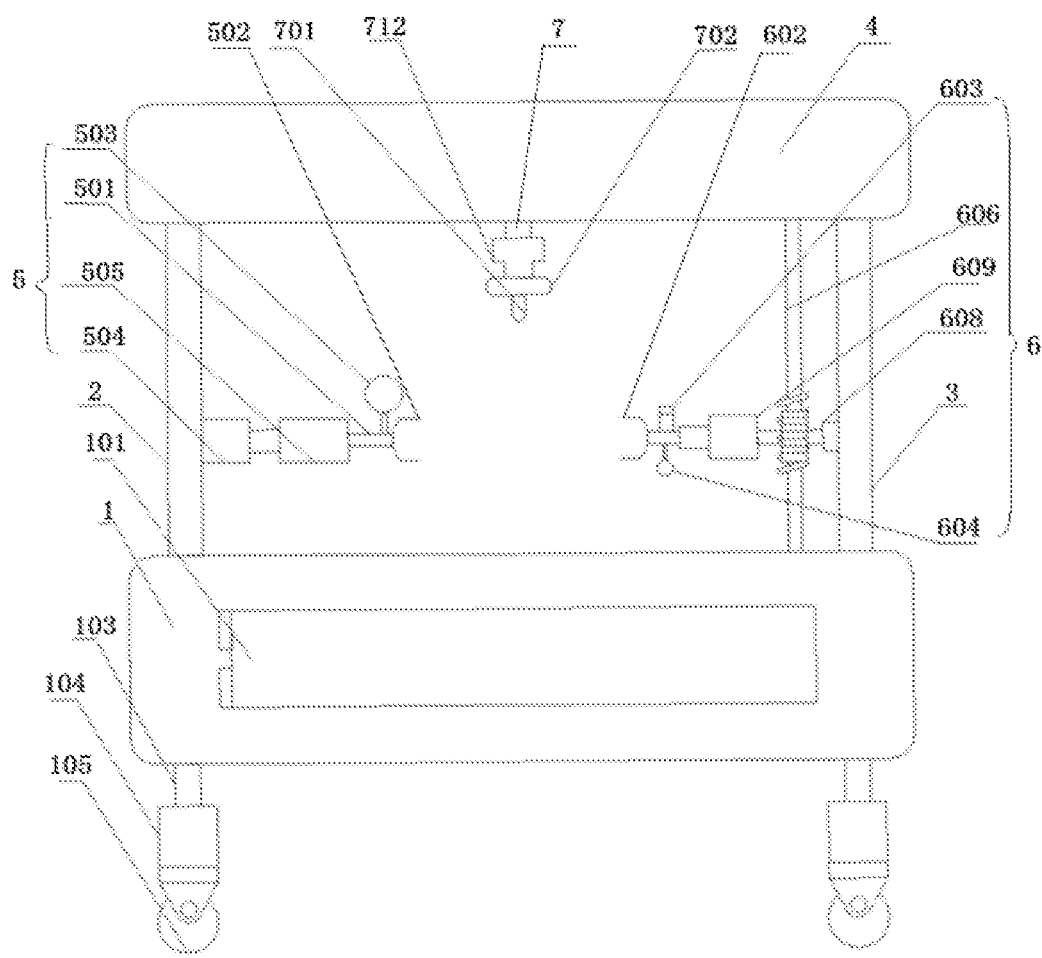
FIG. 1 is a schematic structural diagram of an embodiment on the shale stress sensitivity testing device in the present invention.
Figure 2:
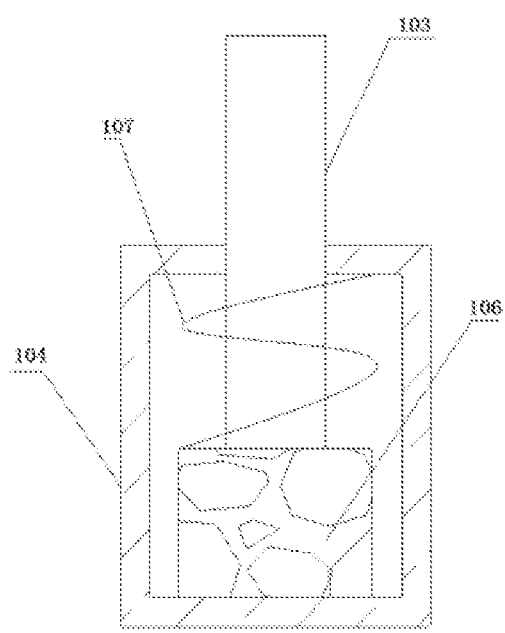
FIG. 2 is a schematic structural diagram of an embodiment on the support block of the shale stress sensitivity testing device in the present invention.
Figure 3:
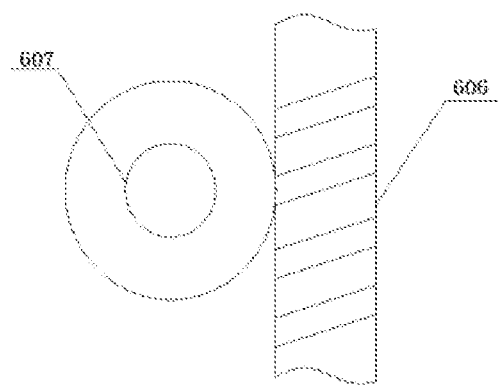
FIG. 3 is a schematic structural diagram of the turbine worm gear of the shale stress sensitivity testing device in the present invention.
Figure 4:
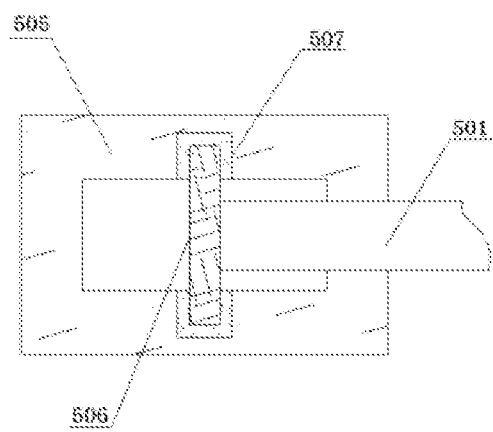
FIG. 4 is a schematic structural diagram of an embodiment on the hollow block of the shale stress sensitivity testing device in the present invention.
Figure 5:
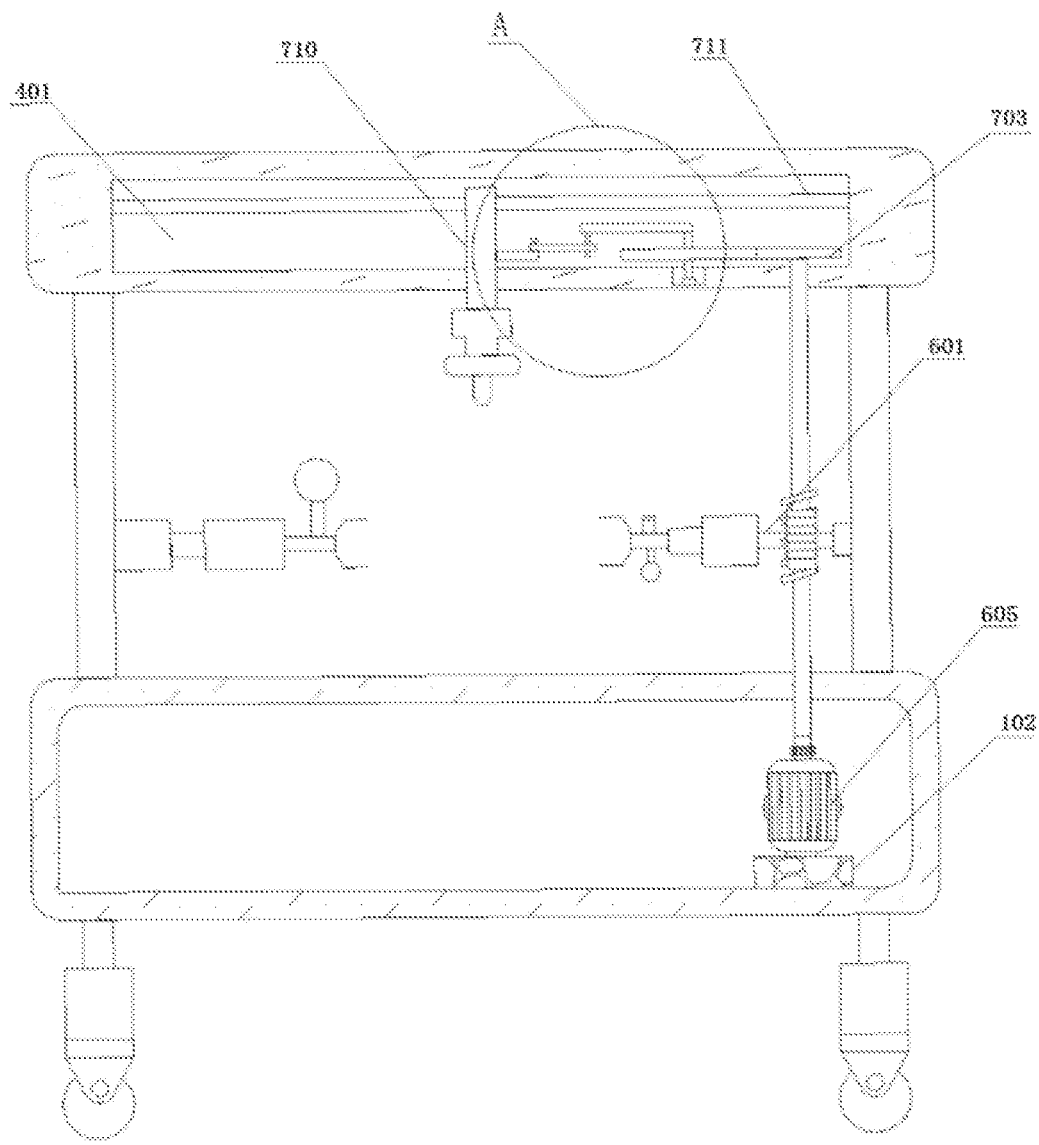
FIG. 5 is a schematic diagram of profile structure in an embodiment on the top plate of the shale stress sensitivity testing device in the present invention.
Figure 6:
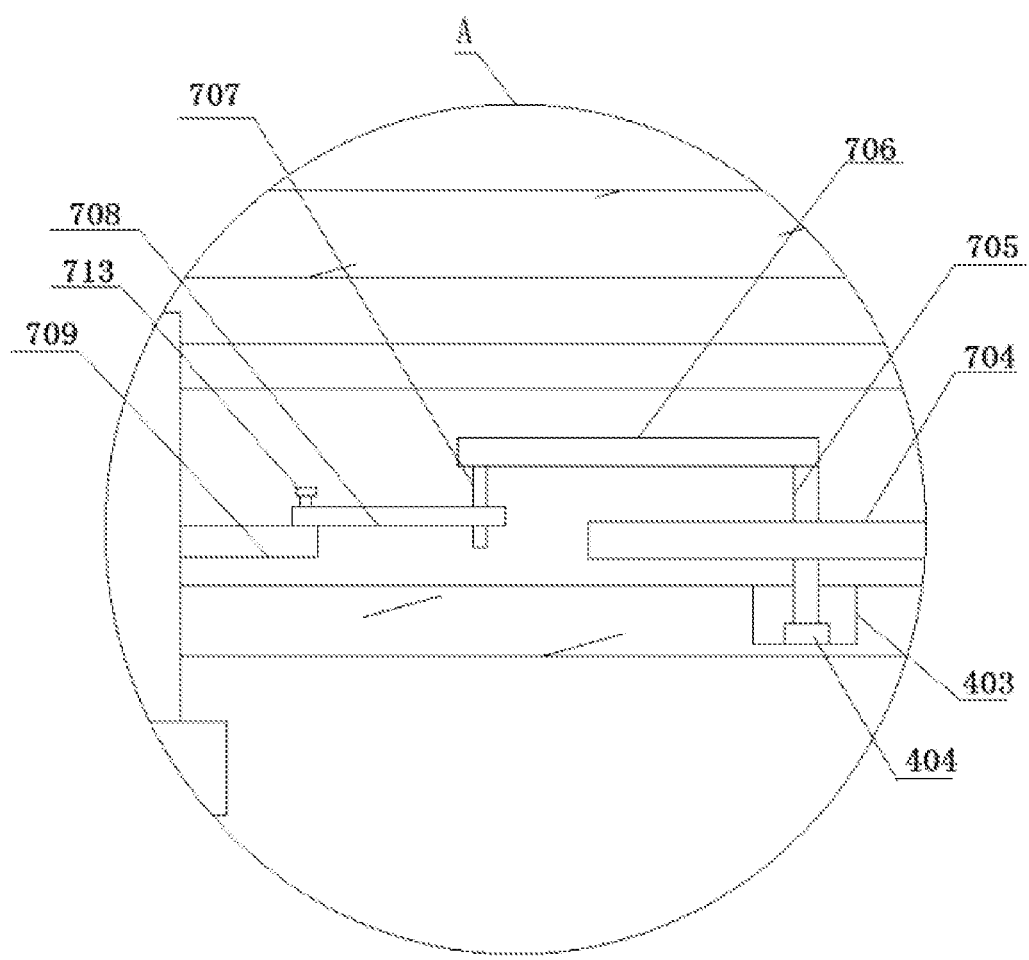
FIG. 6 is a schematic structural diagram of Part A in FIG. 5.
Figure 7:
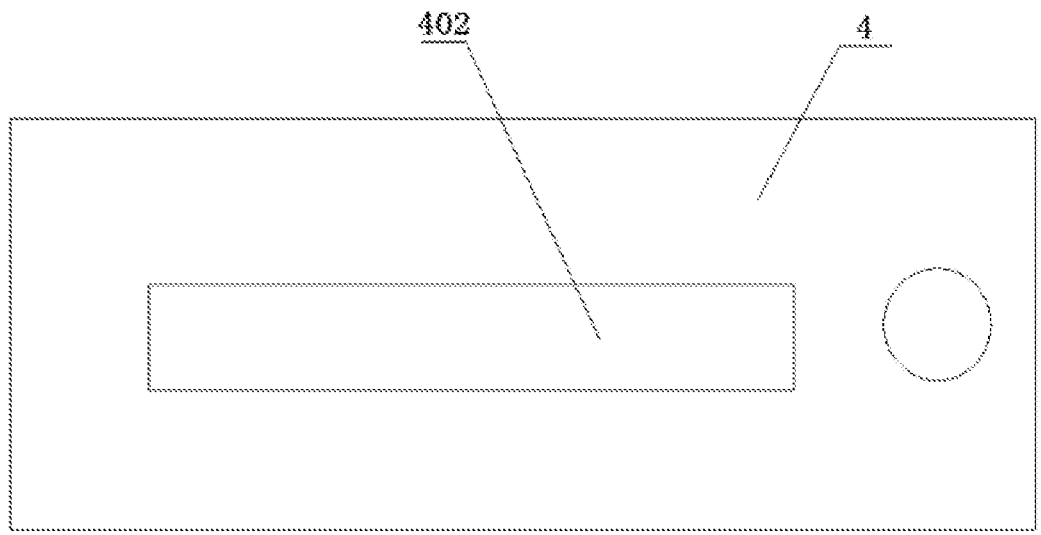
FIG. 7 is a bottom view of structural diagram of the top plate in FIG. 5.

1-Support Table, 101-Cabinet Door, 102-Shock Pad, 103-Support Column, 104-Support Block, 105-Universal Wheel with Brake, 106-Rubber Pad, 107-Buffer Spring, 2-Left Side Plate, 3-Right Side Plate, 4-Top Plate, 401-Hollow Slot, 402-Rectangular Opening, 403-Groove, 404-Second Bearing, 5-First Core Clamp, 501-First Connecting Rod, 502-First Chuck, 501-Air Source, 504-First Cylinder, 505-Hollow Block, 506-Circular Plate, 507-Circular Slot, 6-Second Core Clamp, 601-Second Connecting Rod, 602-Second Chuck, 603-Pressure Relief Valve, 604-Permeability Tester, 605-Drive Motor, 606-Worm Gear, 607-Turbine, 608-First Bearing, 609-Second Cylinder 7-Stress Loading Device, 701-Indenter, 702-Pressure Sensor, 703-First Gear, 704-Second Gear, 705-Third Connecting Rod, 706-Fourth Connecting Rod, 707-Fifth Connecting Rod, 708-Sixth Connecting Rod, 709-Seventh Connecting Rod, 710-Eighth Connecting Rod, 711-Ninth Connecting Rod, 712-Third Cylinder, 713-Pin.

DETAILED DESCRIPTION OF THE EMBODIMENTS

The present invention is further described with reference to the drawings and embodiments. It should be noted that the embodiments in this application and the technical features the embodiments can be combined with each other without conflict. It is to be noted that, unless otherwise specified, all technical and scientific terms herein have the same meaning as commonly understood by those of ordinary skill in the art to Which this application belongs. "Include" or "comprise" and other similar words used in the present disclosure mean that the components or objects before the word cover the components or objects listed after the word and its equivalents, but do not exclude other components or objects.

In the present invention, the terms "first", "second", etc. are used to distinguish similar objects, but not to describe a specific order or sequence, in the absence of any indication to the contrary. The terms "upper", "lower", "left", "right", etc. are usually used in relation to the orientation shown in the attached figures, or in relation to the vertical, perpendicular or gravitational direction of the components themselves; similarly, for ease of understanding and description, "internal/inside", "external/outside", etc. refer to the inside and outside relative to the contour of each component itself. However, the above nouns of locality are not intended to limit the present invention.

On the one hand, as shown in FIGS. 1 to 7, the present invention provides a shale stress sensitivity testing device comprising a support table (1), wherein a left side plate (2) and a right side plate (3) are arranged at the left and right ends of upper surface of the support table (1) and connected with the left and right ends of the top plate (4) at the top.

The left side plate (2) is provided with a first core clamp (5) extending toward the right side plate (3); the first core clamp (5) consists of a first connecting rod (501) and a first chuck (502); the first connecting rod (501) is provided with at least a hollow section 1, the top of the hollow section 1 that is connected to the air source (503) at the top, and the first chuck (502) is provided with a first fluid channel that is connected to the hollow section 1; the first chuck (502) is capable of reciprocating motion in the horizontal direction and circular motion around the central axis of the first connecting rod (501);

The tight side plate (3) is provided with a second cote damp (6) extending toward the left side plate (2); the second core clamp (6) consists of a second connecting rod (601) and a second chuck (602) the second connection rod (601) is provided with at least a hollow section 2 that is provided with a pressure relief valve (603) and connected with a permeability tester (604), and the second chuck (602) is provided with a second fluid channel that is connected to the hollow section 2; the second chuck (602) is capable of reciprocating motion in the horizontal direction and circular motion around the central axis of the second connecting rod (601);

The top plate (4) is provided with a stress loading device (7) extending toward the support table (1); the stress loading device (7)comprises an indenter (701) and a pressure sensor (702) which is arranged on the top of the indenter (701) that is capable of reciprocating motion in the horizontal and vertical directions.

In order to prevent the escape of air from the contact surface of the chucks of the first core clamp (5) and the second core clamp (6) and the core; alternatively, the first chuck (502) and the second chuck (602) both comprise a circular face matching the end face of the core and a wrapping face extending in the axial direction of the cone. Alternatively, the inner surface of the wrapping surface is further provided with a seal ring.

In a specific embodiment, the first core clamp (5) further comprises a first cylinder (504), a hollow block (505), and a circular plate (506), the first connecting rod (501) comprises a first connecting rod 1 and a first connecting rod 2, and the hollow section I is arranged on the first connecting rod 2;

The first cylinder (504) is arranged on the left side plate (2), and the first cylinder (504), the first connecting rod 1, the hollow block (505), the first connecting rod 2, and the first chuck (502) are connected in sequence;

The inner diameter of the hollow block (505) is smaller than the outer diameter of the circular plate (506), the inner wall of the hollow block (505) is provided with a circular slot (507) whose inner diameter is larger than the outer diameter of the circular plate (506), the circular plate (506) is arranged in the circular slot (507), the left end of the first connecting rod 2 is connected to the circular plate (506) after running through the right wall of the hollow block (505).

When the first core clamp (5) of this embodiment is put into service, the circular plate (506) can make circumferential movement in the circular slot (507), thereby driving the first connecting rod 2 and the first chuck (502) to make circumferential movement around the central axis of the first connecting rod (501); the first core clamp (5) is capable of reciprocating motion in the horizontal direction under the horizontal expansion and contraction of the first cylinder (504).

In a specific embodiment, the second core clamp (6) further comprises a drive motor (605), a worm gear (606), a turbine (607), a first bearing (608), and a second cylinder (609), and the second connecting rod (601) comprises a second connecting rod 1 and a second connecting rod 2; the hollow section 2 is arranged on the second connecting rod 2;

The drive motor (605) is arranged on the support table (1), the bottom of the worm gear (606) is connected to, the output terminal of the drive motor (605), and the turbine (607) is engaged with the worm gear (606);

The first bearing (608) is arranged on the right side plate (3), the right end of the second connecting rod 1 is connected to the first bearing (608) after running through the turbine (607), the left end of the second connecting rod 1 is connected with the right end of the second cylinder (609), and the left end of the second cylinder (609) is connected with the right end of the second connecting rod 2.

When the second core clamp (6) of this embodiment is put into service, the drive motor (605) drives the worm gear (606) to rotate, and the worm goat (606) drives the turbine (607) to make circumferential movement, thereby driving the second connecting rod 1 to circularly move and further driving the second chuck (602) to circularly move around the central axis of the second connecting rod (601); the second core clamp (6) is capable of reciprocating motion in the horizontal direction under the horizontal expansion and contraction of the second cylinder (609).

In another specific embodiment based on the above embodiment, a hollow slot (401) is arranged inside the top plate (4), and a rectangular openings (402) is made on the bottom of the top plate (4) and drilled thoroughly to the hollow slot (401);

The stress loading device (7) further comprises a first gear (703), a second gear (704), a third connecting rod (705), a fourth connecting rod (706), a fifth connecting rod (707), a sixth connecting rod (708), a seventh connecting rod (709), an eighth connecting rod (710), a ninth connecting rod (711), and a third cylinder (712); the length of the fourth connecting rod (706) is greater than the radius of the second gear (704), and the horizontal plane where the bottoms of the fifth connecting rod (707) and the sixth connecting rod (708) are located is higher than the horizontal plane whether the upper surface of the second gear (704) is located;

The left and right ends of the ninth connecting rod (711) are connected with the left and right inner walls of the hollow slot (401), the eighth connecting rod (710) is connected with the ninth connecting rod (711) in a sliding manner, and the bottom of the eighth connecting rod (710) is connected to the third cylinder (712) after running through the rectangular opening (402), the bottom of the third cylinder (712) is connected to the pressure sensor (702), and the bottom of the pressure sensor (702) is connected to the indenter (701);

The worm gear (606) runs through the top plate (4) to enter the hollow slot (401) and then is fixedly connected with the first gear (703), the second gear (704) engages with the first gear (703), the lower part of the third connecting rod (705) is fixedly connected with the second gear (704), the top of the third connecting rod (705) is fixedly connected with the fourth connecting rod (706), the top of the fifth connecting rod (707) is fixedly connected with the left aide of the fourth connecting rod (706), the right end of the sixth connecting rod (708) is sleeved on the outer wall of the fifth connecting rod (707) bottom, the left end of the sixth connecting rod (708) is flexibly connected to the tight end of the seventh connecting rod (709) through the pin (713), and the left end of the seventh connecting rod (709) is fixedly connected with the eighth connecting rod (710).

When the stress loading device (7) of this embodiment is put into service, the driving motor (505) drives the worm gear (606) to rotate, the worm gear (606) drives the first gear (703) to rotate, the first gear (703) drives the second gear (704) to rotate, the second gear (704) drives the third connecting red (7051 to rotate, the third connecting red (705) drives the fourth connecting rod (706) to rotate, the fourth connecting rod (706) drives the fifth connecting rod (707) to rotate, and the fifth connecting rod (707) drives the sixth connecting rod (708) to rotate, thereby driving the seventh connecting rod (709) to reciprocate in the horizontal direction and further driving the eighth connecting rod (710), the sixth connecting rod (708) and the third cylinder (712), the pressure sensor (702) and the indenter (701) to reciprocate in the horizontal direction as a whole; the indenter (701) is capable of reciprocating motion in the vertical direction under the vertical direction under the vertical expansion and contraction of the third cylinder (712), thereby changing the intensity of effective stress.

In order to enhance the stability of the third connecting rod (705), alternatively, a groove (403) is arranged on the inner surface of the bottom of the hollow slot (401), a second bearing (404) is provided at the bottom of the groove (403), and the third connecting rod (705) is connected to the second bearing (404) after running through the second gear (704).

In a specific embodiment, the support table (1) is in a form of cabinet, a cabinet door (101) is hinged on one side of the cabinet (1), the drive motor (605) is arranged in the cabinet, and the lower end of the worm gear (606) is connected to the output terminal of the drive motor (605) after running through the cabinet. In order to reduce the vibration amplitude of the drive molar (605), alternatively a shock pad (102) is provided between the drive motor bottom and the cabinet; the shock pad (102) alternatively can be a rubber pad.

In order to make the support table (1) move easily, alternatively, the bottom of the support table (1) is provided with a support column (103), a support block (104), and a universal wheel (105) with a brake, which are connected in sequence. Alternatively, the inner bottom of the support block (104) is provided with a rubber pad (106), the bottom of the support column (103) is arranged on the rubber pad (106) after running through the top of the support block (104), and the outer wall of the support column (103) arranged inside the support block (104) is sleeved with a buffer spring (1071); one end of the buffer spring (107) is connected with the rubber pad (106) and the other end is connected with the inner top of the support block (104).

What needs illustration is that, in addition to that the structure is used in the above embodiment drives the chucks of the first clamp (5) and the second clamp (6) to reciprocate in the horizontal direction and circularly move in the front-rear direction, and drives the indenter of the stress loading device (7) to reciprocate in the horizontal and vertical direction, the invention can also use other horizontal reciprocating mechanism and circular moving mechanism in the prior art to achieve the function. For example, the stress loading device is securely connected to the eighth connecting rod vertically by directly arranging one connecting rod, and the other end of the arranged connecting rod is fixedly connected to the output terminal of the linear reciprocating motor, etc.

On the other hand, the present invention also provides a shale stress sensitivity testing method, wherein the shale stress sensitivity tester described in any one of the above is used for testing, including the following steps:

Step 1: Select a core and measure its initial permeability;

Step 2: Clamp the core with the first core clamp (5) and the second core clamp (6);

Step 3: Apply effective stress to the cote by the stress loading device (7);

Step 4: Inject air into the core from the air source (503), and test the permeability value of the core under the effective stress described in Step 3 by means of the permeability tester (604);

Step 5: Adjust the test pressure through the pressure relief valve (603), change the effective stress applied in Step 3 and repeat Step 4 to obtain the core permeability values under different effective stresses, and then calculate the dimensionless permeability value by the following equation:

$$K_D = \ln\frac{k_i}{k_0} \tag{1}$$

Where, $K_D$ is dimensionless permeability: $k_i$ is the permeability under effective stress $\Delta P_1$; $k_0$ is the initial permeability of core;

Step 6: Linearly regress the data by taking the of stress as the abscissa and the dimensionless permeability value as the ordinate; the straight slope obtained is the stress sensitivity coefficient.

Figure 8:
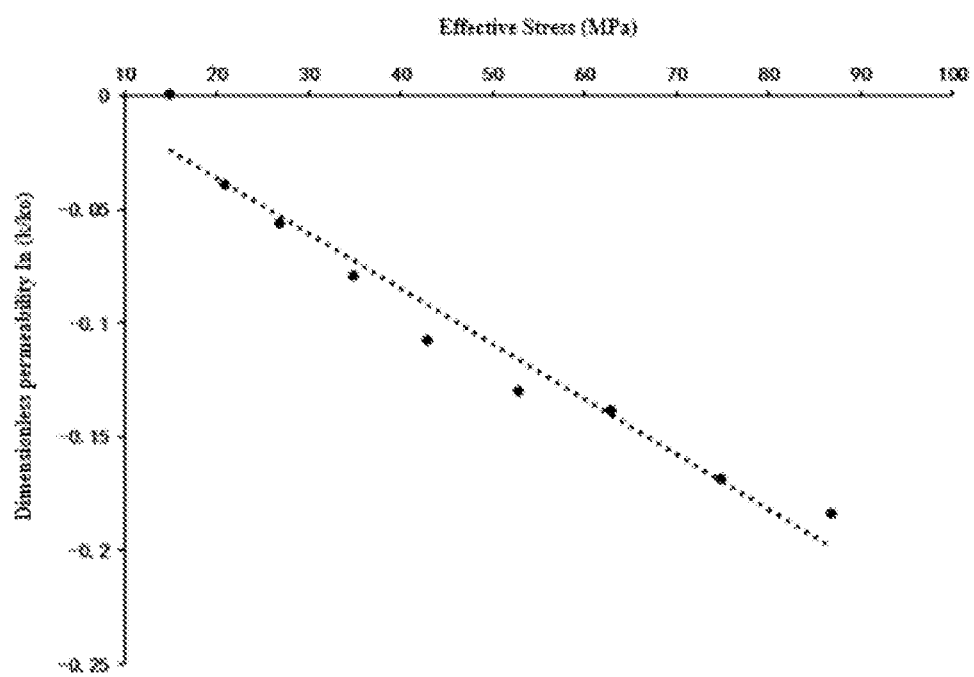
FIG. 8 is a schematic diagram of the test result of a specific embodiment on the shale stress-sensitive detection method in the present invention.

In a specific embodiment, the stress-sensitive results of a core measured by the shale stress sensitivity testing method described in the present invention are shown in FIG. 8.

The above are only the preferred embodiments, which are not intended to limit the present invention in any form. Although the present invention has been disclosed as above with preferred embodiments, it is not intended to limit the present invention. Those skilled in the art, within the scope of the technical solution of the present invention, can use the disclosed technical content to make a few changes or modify the equivalent embodiment with equivalent changes. Within the scope of the technical solution of the present invention, any simple modification, equivalent change and modification made to the above embodiments according to the technical essence of the present invention are still regarded as a part of the technical solution of the present invention.

What is claimed is:

1. A shale stress sensitivity testing device, comprising a support table, where a left side plate and a right side plate are arranged at the left and right ends of upper surface of the support table and connected with the left and right ends of a top plate at the top:

The left side plate is provided with a first core clamp extending toward the right side plate; the first care clamp consists of a first connecting rod and a first chuck; the first connecting rod is provided with at least a hollow section 1, the top of the hollow section 1 that is connected to an air source at the top, and the first chuck is provided with a first fluid channel that is connected to the hollow section 1: the first chuck is capable of reciprocating motion in the horizontal direction and circular motion around the central axis of the first connecting rod;

The right side plate is provided with a second core clamp extending toward the left side plate; the second core clamp consists of a second connecting rod and a second chuck; the second connecting rod is provided with at least a hollow section 2 that is provided with a pressure relief valve and connected with a permeability tester, and the second chuck is provided with a second fluid channel that is connected to the hollow section 2; the second chuck is capable of reciprocating motion in the horizontal direction and circular motion around the central axis of the second connecting rod;

The second core clamp further comprises a drive motor, a worm gear, a turbine, a first bearing, and a second cylinder, and the second connecting rod comprises a second connecting rod 1 and a second connecting rod 2; the hollow section 2 is arranged on the second connecting rod 2;

The drive motor is arranged on the support table, the bottom of the worm gear is connected to the output terminal of the drive motor, and the turbine is engaged with the worm gears;

The first bearing is arranged on the right side plate, the right end of the second connecting rod 1 is connected to the first bearing after running through the turbine, the left end of the second connecting rod 1 is connected with the right end of the second cylinder, and the left end of the second cylinder is connected with the right end of the second connecting rod 2;

The top plate is provided with a stress loading device extending toward the support table; the stress loading device comprises an indenter and a pressure sensor which is arranged on the top of the indenter that is capable of reciprocating motion in the horizontal and vertical directions;

A hollow slot is arranged inside the top plate, and a rectangular opening is made an the bottom of the top plate and drilled thoroughly to the hollow slot;

The stress loading device further comprises a first gear, a second gear, a third connecting rod, a fourth connecting rod, a fifth connecting rod, a sixth connecting rod, a seventh connecting rod, an eighth connecting rod, a ninth connecting rod, and a third cylinder; the length of the fourth connecting rod is greater than the radius of the second gear;

The left and right ends of the ninth connecting rod are connected with the left and right inner walls of the hollow slot, the eighth connecting rod is connected with the ninth connecting rod 1 in a sliding manner, and the bottom of the eighth connecting rod is connected to the third cylinder after running through the rectangular opening, the bottom of the third cylinder is connected to the pressure sensor, and the bottom of the pressure sensor is connected to the indenter;

The worm gear runs through the top plate to enter the hollow slot and then is fixedly connected with the first gear, the second gear engages with the first gear, the lower part of the third connecting rod is fixedly connected with the second gear, the top of the third connecting rod is fixedly connected with the fourth connecting rod, the top of the fifth connecting rod is fixedly connected with the left side of the fourth connecting rod, the right end of the sixth connecting rod is sleeved on the outer wall of the fifth connecting rod bottom, the left end of the sixth connecting rod is flexibly connected to the right end of the seventh connecting rod through a pin, and the left end of the seventh connecting rod is fixedly connected with the eighth connecting rod.

2. The shale stress sensitivity testing device according to claim 1, where in the first core clamp further comprises a first cylinder, a hollow block, and a circular plate, the first connecting rod comprises a first connecting rod 1 and a first connecting rod 2, and the hollow section 1 is arranged on the first connecting rod 2;

The first cylinder is arranged on the left side plate, and the first cylinder, the first connecting rod 1, the hollow block, the first connecting rod 2, and the first chuck are connected in sequence The inner diameter of the hollow block is smaller than the outer diameter of the circular plate, the inner wall of the hollow block is provided with a circular slot whose inner diameter is larger than the outer diameter of the circular plate, the circular plate is arranged in the circular slot, the left end of the first connecting rod 2 is connected to the circular plate after running through the right wall of the hollow block.

3. The shale stress sensitivity testing, device according to claim 1, wherein the support table is in a form of cabinet, and a cabinet door is hinged on one side of the cabinet.

4. The shale stress sensitivity testing device according to claim 3, wherein the drive motor is arranged in the cabinet, and the lower end of the worm gear is connected to the output terminal of the drive motor after running through the cabinet.

5. The shale stress sensitivity testing device according to claim 4, wherein a shock pad is provided between the drive motor bottom and the cabinet.

6. The shale stress sensitivity testing device according to claim 1, wherein a groove is arranged on the inner surface of the bottom of the hollow slot, a second bearing is provided at the bottom of the groove, and the third connecting rod is connected to the second bearing after running through the second gear.

7. The shale stress sensitivity testing device according to claim 1, wherein the support table further comprises a support column, a support block, and a universal wheel with a brake, which are connected in sequence, and support column is connected with the bottom of the support table;

The inner bottom of the support block is provided with a rubber pad, the bottom of the support column is arranged on the rubber pad after running through the top of the support block, and the outer wall of the support column arranged inside the support block is sleeved with a buffer spring; one end of the buffer spring is connected with the rubber pad and the other end is connected with the inner top of the support block.

8. A shale stress sensitivity testing method, wherein the shale stress sensitivity tester described in claim 1 is used for testing comprising the following steps:
Step 1: Select a core and measure its initial permeability;
Step 2: (lamp the core with the first core clamp and the second core clamp;
Step 3: Apply effective stress to the core by the stress loading device;

Step 4: Inject air into the core from the air source, and test the permeability value of the core under the effective stress described in Step 3 by means of the permeability tester:

Step 5: Adjust the test pressure through the pressure relief valve, change the effective Stress applied in Step 3 and repeat Step 4 to obtain the core permeability values under different effective stresses, and then calculate the dimensionless permeability value;

Step 6; Linearly regress the data by taking the effective stress as the abscissa and the dimensionless permeability value as the ordinate; the straight slope obtained is the stress sensitivity coefficient.

* * * * *